INVENTOR.
Richard C. Spurgeon,
BY
Paul & Paul
ATTORNEYS.

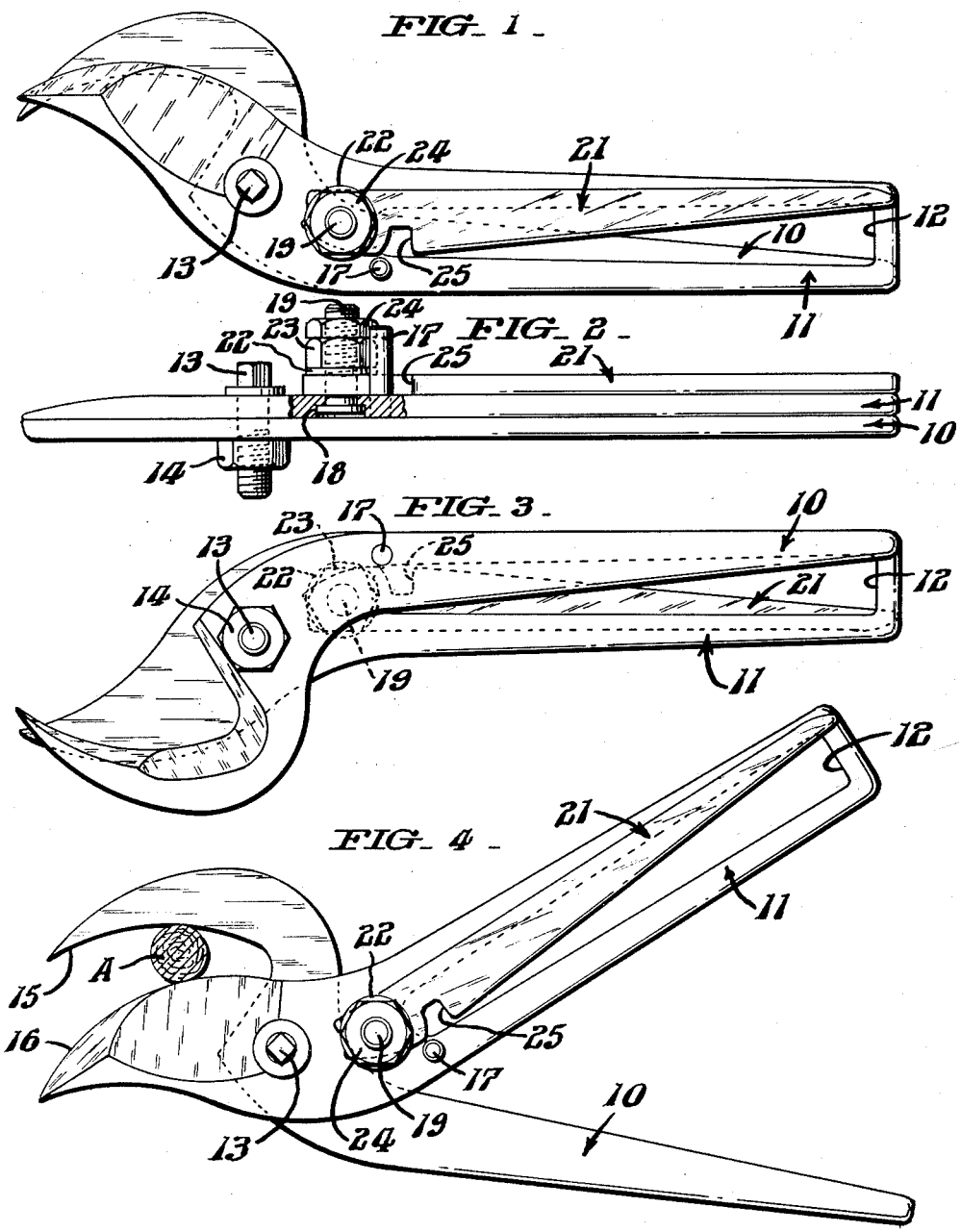

United States Patent Office 3,146,527
Patented Sept. 1, 1964

3,146,527
PRUNING SHEARS
Richard C. Spurgeon, P.O. Box 646, R.D. 2,
Lansdale, Pa.
Filed Oct. 17, 1962, Ser. No. 231,105
2 Claims. (Cl. 30—254)

This invention relates to improved pruning shears, and more particularly it relates to an improvement in pruning shears adapted to be operated by one hand of a person.

In the practice of gardening, forestry and orchardry, the importance of swift and effective pruning is well known. It is also well known that many limbs, branches, twigs and the like are often situated in partially hidden, highly elevated, or other difficult-to-reach locations, whereby proper pruning in such situations becomes difficult, costly and time consuming. Pruning implements have been heretofore developed utilizing shears which are mounted on extension handles, and utilizing mechanisms for the purpose of creating mechanical advantages for the shears which are necessary to accomplish the desired pruning operation. However, all of the prior attempts in this direction, require either motorized apparatus, or at the least implements requiring the use of both hands of an operator. In the practice of pruning, it is well known that trees and bushes must be often climbed in order to accomplish the proper pruning, and in this event it is desirable that the climber utilize one arm and hand to assist his climbing while leaving the other arm and hand free for the pruning job.

It is therefore an object of this invention to provide a novel pruning shear which may be operated by one hand of a person, while offering a greatly increased mechanical advantage for the pruning of oversized branches, limbs and the like.

It is another object of this invention to provide such a pruning shear that is compact and readily portable.

These and other objects of this invention, as well as the advantages attendant thereto will become readily apparent from the following description and drawings wherein:

FIGURE 1 is a top view of the pruning shears of this invention;

FIGURE 2 is a side elevational view of the pruning shears shown in FIGURE 1;

FIGURE 3 is a bottom view of the pruning shears shown in FIGURE 1;

FIGURE 4 is a top view of the pruning shears shown in FIGURE 1, the elements of the shears being in an operating position;

Figure 5:
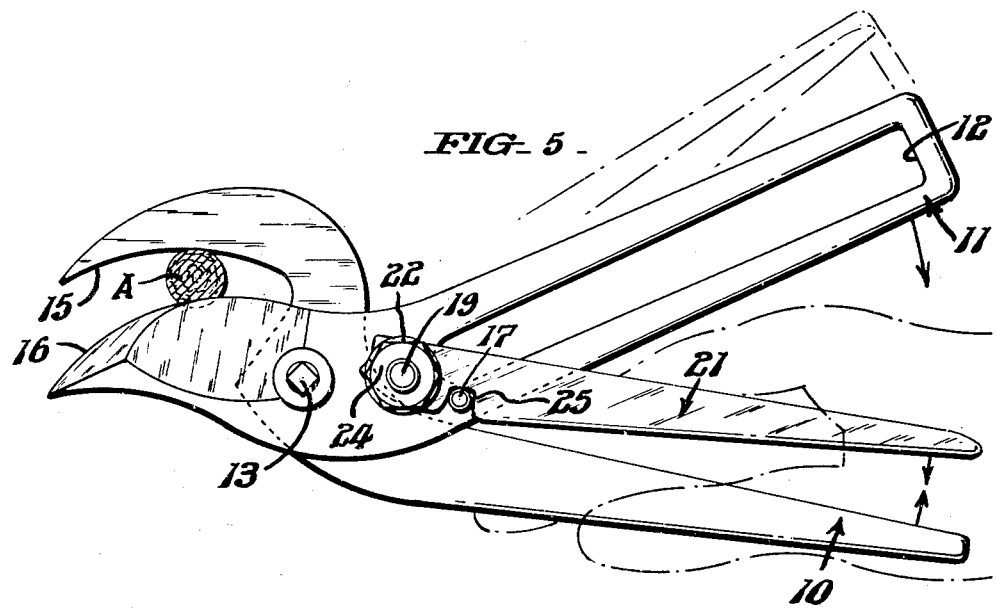
FIGURE 5 is a top view of the shears shown in FIGURE 1, the elements thereof being in a second operating position.

Referring now to FIGURES 1, 2, 3 and 4, the shears constructed in accordance with this invention comprise a solid handle 10, a mating handle 11 having a cut-out opening 12 formed therein, a threaded pivot 13, a nut 14 disposed on said threaded pivot, said pivot 13 and nut 14 pivotally connecting handles 10 and 11 in cutting relationship to each other. The solid handle 10 has a cutting edge 15 formed thereon, and the mating handle 11 has a cutting edge 16 formed thereon. As shown in FIGURE 4, the cutting edges are adapted to cooperate to cut a piece of wood A from the starting position there shown. The handle 11 has inserted therein, in normal relationship thereto, a short bearing pin 17 which pin is positioned towards the hand gripping end of the handle 11 with respect to the pivot 13. There it also formed in mating handle 11 a countersunk bored recess 18 within which is disposed a close-fitting threaded pivot 19. As thus disclosed it is apparent that the threaded pivot 19 will not interfere with the cooperative action of the handle pair 10, 11.

A freely pivotable auxiliary handle 21 is disposed upon the pivot 19 in overlying relationship to the hand gripping portion of the mating handle 11, whereby the length of the auxiliary handle 21 is substantially the same as that of the hand gripping portion of handles 10 and 11. The relationship between handle 21, pivot 19 and handle 11 is maintained by means consisting of a washer 22, nut 23 and lock nut 24. Additionally, auxiliary handle 21 has formed along one edge thereof a notch 25 which notch is dimensioned so as to receive the bearing pin 17 during a pivot swing of handle 21 about pivot 19 in a clock-wise direction.

Figure 6:
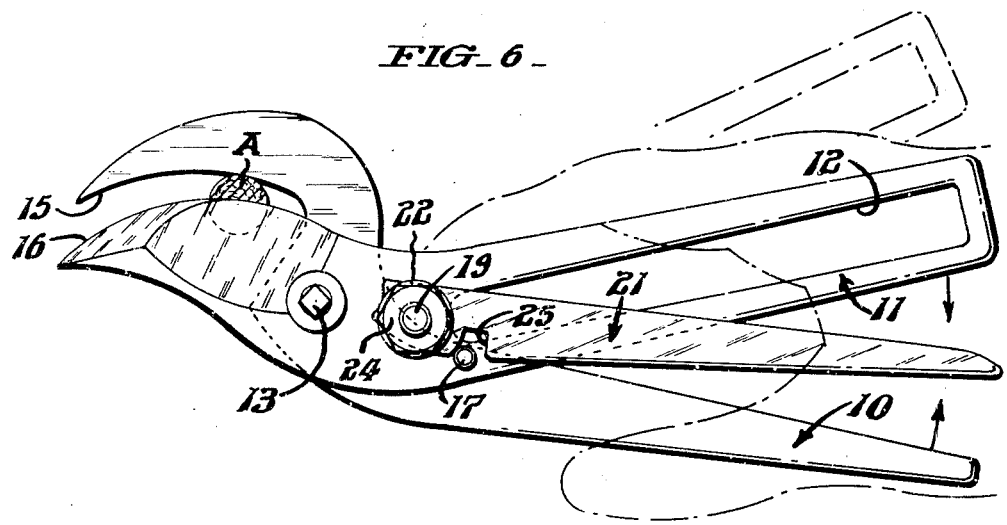
FIGURE 6 is a top view of the shears shown in FIGURE 1, the elements thereof being in a third operating position.

Referring now to FIGURES 1, 4, 5 and 6, to operate the shears of this invention, the shears are first positioned as shown in FIGURE 4. It must be understood that the scale of the drawing is one-half normal scale, and as thus disposed, the opening formed by the angulation of handle 11 and handle 10 is of such as extent to prevent the exertion by a normal sized hand of sufficient leverage to accomplish an effective cut of the wooden object. Therefore, the construction of instant shears permit the first cut to be made by allowing the freely pivotable auxiliary handle 21 to swing clock-wise about the pivot 19 until stopped by the bearing pin 17, at which point the handle 21 may be grasped by a single hand and fingers, and pressure exerted, whereupon the cutting edges 15, 16 partially sever the wooden object A, bringing the assembled elements of the shears to the relative positions shown in FIGURE 5. At this point, the lower side of the handle opening 12 may be next grasped by the fingers being inserted therein, and a second cut as shown in FIGURE 6 made bringing the assembly to the relative position shown in solid lines in FIGURE 6. As shown by the phantom outline of a hand in FIGURE 6, the final cut severing the object A is made by grasping the outside of the hand gripping portion of handle 11 and forcing the handles 10, 11 in the direction shown by the arrows whereupon the final position at severance is represented in FIGURE 1. It will thus be seen that three incremental cuts are made possible by the shear construction of this invention whereupon the maximum pressure afforded by a single hand may be imparted to the cutting action, while not removing the hand completely from the implement, and without rendering the shears unwieldy or of complicated construction. In the above manner, it is possible to cut pieces of wood having diameters greater than that which could ordinarily be cut with conventional shear construction of the single hand type.

Having thus described my invention, I claim:

1. In a shear implement, the combination of a handle pair, each handle of said pair comprising a hand gripping portion and a cutting edge portion, a first pivot connecting said handle pair mediate the hand gripping portion and cutting edge portion of each handle, one of said handles having an elongated opening formed lengthwise of the hand gripping portion thereof and adapted to present an inner and outer surface of said handle for hand-grasping access thereto, a second pivot secured to said handle having said opening formed therein at a point medially of the first pivot and the distal end of said handle and extending outwardly from said handle away from the cutting plane of the cutting edges, an auxiliary handle connected to said pivot in a freely pivotable relationship, a bearing pin secured to said handle having an opening formed therein at a point mediate said second pivot and the distal end of said auxiliary handle, and means formed on said auxiliary handle to engage said pin during clockwise movement thereof.

2. In a shear implement including in combination pivotally connected blade and handle means, one of said handle means having an opening formed therein consisting separate pivot means, whereby said auxiliary handle means having such opening formed therein also having separate pivot means mounted thereon medially of the pivotal connection of the blade and handle means and the distal end of said handle means, and also having pin means mounted thereon which projects normally from said handle means and mediate said separate pivot means and the distal end of said handle means, an auxiliary handle means secured to and adapted to pivot about said separate pivot means, whereby said auxiliary handle means engages said pin means in leverage effecting relationship to said handle means having such opening formed therein.

References Cited in the file of this patent

UNITED STATES PATENTS

| | | |
|---|---|---|
| 430,677 | Pearsall | June 24, 1890 |
| 632,351 | Jensen | Sept. 5, 1899 |
| 643,539 | Rowe | Feb. 13, 1900 |
| 993,646 | Burkett | May 30, 1911 |
| 2,801,468 | Anderson | Aug. 6, 1957 |

UNITED STATES PATENT OFFICE
CERTIFICATE OF CORRECTION

Patent No. 3,146,527                          September 1, 1964

Richard C. Spurgeon

It is hereby certified that error appears in the above numbered patent requiring correction and that the said Letters Patent should read as corrected below.

Column 1, line 67, before "handle" insert -- mating --; column 2, line 7, for "portion" read -- portions --; line 22, for "as" read -- an --; column 3, line 6, for "separate pivot means, whereby said auxiliary" read -- of inner and outer hand grasping surfaces, said --.

Signed and sealed this 12th day of January 1965.

(SEAL)
Attest:

ERNEST W. SWIDER
Attesting Officer

EDWARD J. BRENNER
Commissioner of Patents